L. F. BRAHMER.
TROLLEY HANGER.
APPLICATION FILED JULY 30, 1920.
1,393,491.
Patented Oct. 11, 1921.
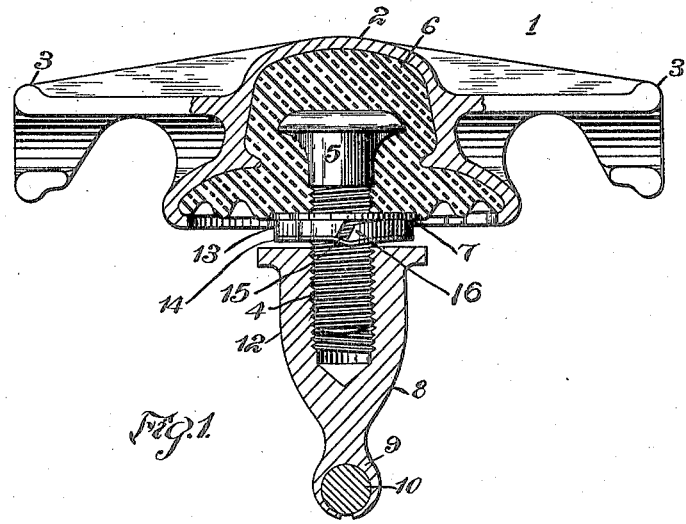
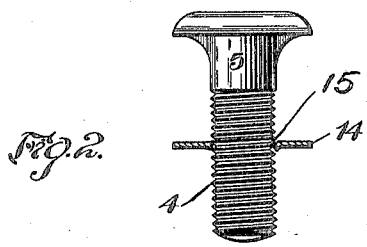
WITNESSES:
INVENTOR
BY
ATTORNEY

UNITED STATES PATENT OFFICE.

LELAND F. BRAHMER, OF EDGEWOOD PARK, PENNSYLVANIA, ASSIGNOR TO WESTINGHOUSE ELECTRIC & MANUFACTURING COMPANY, A CORPORATION OF PENNSYLVANIA.

TROLLEY-HANGER.

1,393,491.

Specification of Letters Patent.   Patented Oct. 11, 1921.

Application filed July 30, 1920.  Serial No. 400,091.

*To all whom it may concern:*

Be it known that I, LELAND F. BRAHMER, a citizen of the United States, and a resident of Edgewood Park, in the county of Allegheny and State of Pennsylvania, have invented a new and useful Improvement in Trolley-Hangers, of which the following is a specification.

My invention relates to locking devices for trolley hangers and particularly to means for holding lock washers in assembled position on threaded studs or bolts in the absence of coöperating nuts, conductor-gripping members and other members for mounting on the studs.

One object of my invention is to provide an extremely simple and economical means for retaining a lock washer in position on a threaded stud or bolt.

Another object of my invention is to provide a relatively thin retaining member for one of two coöperating members mounted on a supporting member to permit the coöperating members to function with each other through the retaining member as they would in the absence of the retaining member.

Heretofore, it has been usual to provide screw-threaded bolts and studs, for coöperation with interiorly threaded nuts and other members, with a well-known type of split lock washer for locking the interiorly threaded members in position on the bolts. It has also been usual to provide other complicated and expensive means for locking screw-threaded members together and to provide devices utilizing lock washers in assembled positions in which they would remain during the handling or shipping of the parts. But no device of such simple, novel and economical character as in my invention has, to the best of my knowledge. been heretofore employed.

While my invention is adapted for wide general use in connection with a great variety of devices, it is especially adapted for use in connection with trolley-conductor-hanger devices where it may be employed to particular advantage.

In electric-railway-overhead line construction, it is customary to provide a trolley-conductor-hanger-member that may be a suspension insulator, for attachment to a guy wire extending transversely to the trolley conductor, or an all-metal hanger for attachment to a messenger cable or other structure. There is frequently employed in these and other structures, a vertically depending threaded stud adapted to receive a so-called trolley ear or other member for supporting a trolley conductor.

The trolley ear, in its final position on the hanger, must, of course, be in alinement with the trolley conductor and, to prevent its chattering on the hanger, must, also, be in relatively tight engagement with the threads of the stud. These conditions have, in the past, conflicted to such a serious extent as to have caused the design of a number of complicated and expensive devices. An ordinary lock washer may be employed but its use has not been widely adopted because manipulation of it is difficult and because it undesirably adds a loose part to the structure that may be lost.

In practising my invention, I provide means for very simply and cheaply attaching a standard lock washer to a standard stud or other member to enable it to be shipped and handled as a part of a unitary structure for instant and effective use and which will remain in position during repeated attaching and detaching of the member or members with which it is adapted to coöperate.

Figure 1 of the accompanying drawings is a transverse view, partially in elevation and partially in section, of a trolley-conductor hanger and a device thereon embodying my invention, and Fig. 2 is a detail view of portions of the device illustrated in Fig. 1.

A trolley hanger 1, of a usual and well known type, comprises an inverted hollow metal body portion 2, transversely extending lugs 3 for attachment to a guy wire (not shown), a screw-threaded stud 4 having a headed end 5 embedded in, and secured to, the hanger by a body of molded insulating material 6, and a washer 7 in the stud 4 at the lower surface of the insulating material 6.

A trolley ear 8, also of a usual and well known type, comprises a longitudinal inverted channel portion 9 for the reception of a trolley conductor 10, lips 11 that are bent around the conductor 10 after the insertion of the latter in the channel portion 9, and a centrally-disposed internally-threaded boss 12 for mounting on the stud 4. It is essential to have the ear 8 mounted on the stud 4 in alinement with the conductor 10 and desirable to have it in relatively tight binding relation to the hanger 1 but it frequently occurs that, when the ear is in its final binding position with respect to the hanger, the channel portion 9 is at such an angle with respect to the conductor 10 as to prevent the insertion of the latter in the channel portion 9. If, when this occurs, the ear 8 is reversely turned to aline the channel portion 9 with the conductor 10, the ear will be loosely related to the stud. Thereafter, passing trolleys will cause relative movement, called chattering, between the ear 8 and the stud 4 and result not only in a very undesirable structure but in damage to the threads.

Lock washers or other loose parts to eliminate the above undesirable conditions have not been considered feasible because manipulation of them is not readily effected and they may become lost. Furthermore, shipment of the hanger as a unitary structure may be thus rendered impracticable.

To overcome all of the above mentioned undesirable features in an extremely simple and economical manner, I propose the use of an ordinary and well known type of split lock washer 13 that is held in position on the stud adjacent to the hanger 1 by a relatively thin pliable washer 14, preferably of metal, although other materials may be used. The lock washer 13 is first placed over the end of the stud 4 and the washer 14, having an opening 15 initially of slightly less diameter than the stud 4 is forced over the end of the stud. This so abrades or turns the edges of the washer 14, as shown in Fig. 2, as to tightly grip the stud and prevent the removal of the washer 14.

When in position against the lock washer 13, as shown in Fig. 1, the washer 14 will conform to the adjacent clamping surface of the washer 13 under all conditions. That is, the gripping end 16 and all other portions of the lock washer 13 that are offset or distorted to yieldingly bind the ear 8 on the stud 4 will function through the washer 14 substantially the same as they would in the absence of the latter. Thus, a self-contained unitary hanger structure that may be conveniently handled and shipped, without danger of the loss of parts, and that permits the ear to be alined with the conductor and, at the same time, held in binding relation thereto is provided in an extremely simple, effective and economical manner by the novel combination of standard parts with the yieldable washer.

While I have shown and described a particular form of my invention, changes may be effected therein without departing from the spirit and scope thereof, as set forth in the appended claims.

I claim as my invention:

1. The combination with a stud or bolt, a member to be locked in position thereon and a lock washer for locking said member, of yieldable means disposed between said member and the lock washer for permanently securing the latter in position and permitting the same to transmit its locking movement to said member.

2. The combination with a stud or bolt and a lock washer therefor, of a yieldable plain washer for holding the lock washer in position and permitting the latter to transmit its locking movement therethrough.

3. The combination with a stud or bolt and a lock washer therefor, of a member permanently secured in position relative to the stud and having a yieldable portion for holding the lock washer in position.

4. The combination with a trolley-conductor hanger device, a stud projecting therefrom, a conductor-holding member for mounting on the stud and a lock washer for disposition between the hanger device and the holding member, of a permanently mounted member having a yieldable portion coöperating with the lock washer for holding the lock washer in position and permitting the same to transmit its locking movement to the holding member.

In testimony whereof, I have hereunto subscribed my name this 27th day of July 1920.

LELAND F. BRAHMER.